US011788984B2

(12) United States Patent
Ning et al.

(10) Patent No.: US 11,788,984 B2
(45) Date of Patent: Oct. 17, 2023

(54) GLUCOSE SENSOR ELECTRODE, PREPARATION METHOD THEREFOR AND USE THEREOF

(71) Applicants: South China University of Technology, Guangzhou (CN); Guangdong University of Technology, Guangzhou (CN)

(72) Inventors: Chengyun Ning, Guangzhou (CN); Zhen'gao Wang, Guangzhou (CN); Peng Yu, Guangzhou (CN); Lei Qian, Guangzhou (CN); Zhengnan Zhou, Guangzhou (CN); Jun Xing, Guangzhou (CN); Junqi Chen, Guangzhou (CN); Lei Zhou, Guangzhou (CN); Guoxin Tan, Guangzhou (CN)

(73) Assignees: South China University of Technology, Guangdong (CN); Guangdong University of Technology, Guangdong (CN)

( * ) Notice: Subject to any disclaimer, the term of this patent is extended or adjusted under 35 U.S.C. 154(b) by 566 days.

(21) Appl. No.: 17/054,790

(22) PCT Filed: Sep. 21, 2018

(86) PCT No.: PCT/CN2018/106842
§ 371 (c)(1),
(2) Date: Nov. 12, 2020

(87) PCT Pub. No.: WO2019/218562
PCT Pub. Date: Nov. 21, 2019

(65) Prior Publication Data
US 2021/0215632 A1 Jul. 15, 2021

(30) Foreign Application Priority Data
May 17, 2018 (CN) .......................... 201810474956.3

(51) Int. Cl.
*G01N 27/327* (2006.01)

(52) U.S. Cl.
CPC ..... *G01N 27/3278* (2013.01); *G01N 27/3271* (2013.01)

(58) Field of Classification Search
None
See application file for complete search history.

(56) References Cited

U.S. PATENT DOCUMENTS

2020/0191780 A1 6/2020 Ning et al.

FOREIGN PATENT DOCUMENTS

| CN | 1815215 A | 8/2006 |
|---|---|---|
| CN | 102262114 A | 11/2011 |

(Continued)

OTHER PUBLICATIONS

P. Yu, et al., "Periodic Nanoneedle and Buffer Zones Constructed on a Titanium Surface Promote Osteogenic Differentiation and Bone Calcification In Vivo", Advanced Healthcare Materials, 5(3): p. 364-372, Feb. 2016.*

(Continued)

*Primary Examiner* — J. Christopher Ball
(74) *Attorney, Agent, or Firm* — THE WEBB LAW FIRM

(57) ABSTRACT

A glucose sensor electrode, a preparation method therefor and the use thereof are provided for the rapid and sensitive detection of glucose. The method involves: (1) performing an alkali heat treatment to form a nanoneedle-structured titanium dioxide on the surface of a titanium electrode; (2) forming micro-region grooves on a nanoneedle-structured titanium dioxide film layer to obtain a nanoneedle-structured titanium dioxide having a micropattern; (3) depositing a chlorine-doped polypyrrole in the grooves by using chronopotentiometry; (4) forming a nanocone-structured citric- (Continued)

Nanoneedle titanium dioxide    Glucose sensor electrode    Nanocone polypyrrole acid-doped polypyrrole on the chlorine-doped polypyrrole by using chronopotentiometry; and (5) grafting an enzyme capable of detecting glucose to obtain the glucose sensor electrode. This simple and stable process is low in cost, efficiently grafts the enzyme capable of detecting glucose on the surface of the electrode, and provides a stable electrode with higher reliability for detecting glucose.

10 Claims, 2 Drawing Sheets

(56) References Cited

FOREIGN PATENT DOCUMENTS

| CN | 102735727 A | 10/2012 |
| --- | --- | --- |
| CN | 107177553 A | 9/2017 |
| CN | 107313093 A | 11/2017 |

OTHER PUBLICATIONS

Cosnier et al., "Mesoporous TiO2 Films: New Catalytic Electrode Materials for Fabricating Amperometric Biosensors Based on Oxidases", Electroanalysis, 1997, pp. 1387-1392, vol. 9, No. 18.

Cosnier et al., "A glucose biosensor based on enzyme entrapment within polypyrrole films electrodeposited on mesoporous titanium dioxide", Journal of Electroanalytical Chemistry, 1999, pp. 176-181, vol. 469.

Ikeda et al., "Development of a needle-type glucose sensor based on a titanium dioxide oxygen electrode for the artificial pancreas", Sensors and Actuators B, 1993, pp. 315-318, vol. 13-14.

* cited by examiner

GLUCOSE SENSOR ELECTRODE, PREPARATION METHOD THEREFOR AND USE THEREOF

CROSS-REFERENCE TO RELATED APPLICATIONS

This application is the United States national phase of International Application No. PCT/CN2018/106842 filed Sep. 21, 2018, and claims priority to Chinese Patent Application No. 201810474956.3 filed May 17, 2018, the disclosures of each of which are hereby incorporated by reference in their entireties.

FIELD OF THE INVENTION

The present invention belongs to the technical field of medical apparatuses and instruments, and in particular relates to a glucose sensor electrode, a preparation method therefor and the use thereof. The glucose sensor electrode is used for the rapid and sensitive detection of glucose.

BACKGROUND OF THE INVENTION

Diabetes is gaining increasing attention. Blood glucose detection has become a potential trend for diagnosing and controlling diabetes. The demand for accurate and sensitive blood glucose detection devices for clinical diagnosis and personal care has grown exponentially. The most widely used method for detecting blood glucose is an electrochemical method. Compared with acoustic, optical and chemiluminescent methods, the electrochemical method has the advantages such as high sensitivity, low cost, easy operation, faster response, and portable miniaturization. The core technology of the electrochemical glucose sensor is electrode design and processing. Due to the excellent properties of nanomaterials such as size effect and high reactivity, various types of nanomaterials such as metal oxides and carbonaceous materials (such as carbon nanotubes and graphene) have been widely used in glucose sensors. The material development has been focused on increasing sensitivity and detection limits. However, glucose sensor electrode materials still have many shortcomings, such as unstable electrode preparation process, high preparation cost, and poor coating adhesion.

SUMMARY OF THE INVENTION

The present invention constructs a glucose sensor electrode of semiconductor nanoneedle titanium dioxide and nanocone-structured conductive polypyrrole, with a micro-region electric field generated between the nanoneedle titanium dioxide and the nanocone polypyrrole in the electrode. The glucose sensor electrode of the present invention is stable in structure; the nanoneedle titanium dioxide and the nanocone polypyrrole have a strong binding force to the conductive substrate, good adsorption for enzymes, and a very good promoting effect on the oxidation reaction of glucose; the electrode of the present invention can detect glucose efficiently.

In order to overcome the shortcomings and deficiencies of the prior art, an object of the present invention is to provide a glucose sensor electrode and a preparation method therefor. The present invention constructs a layer of glucose sensor coating with high efficiency on the surface of the titanium electrode by alkali heat treatment, laser etching and electrochemical methods. The coating has the micro-region characteristics of conductive nanocone-structured polypyrrole and semiconductor nanoneedle-structured titanium dioxide. In the electrode of the present invention, the nanoneedle titanium dioxide has good catalytic properties, and a micro-region electric field is generated between the nanoneedle titanium dioxide and the nanocone polypyrrole, which can further promote the adhesion of proteins and allow efficient graft of protease (glucose oxidase) on the electrode surface. The coating (nanoneedle titanium dioxide and nanocone polypyrrole) on the electrode surface of the present invention has high protease adhesion characteristics and high detection sensitivity of the nanocone structure, realizing high-sensitivity glucose detection.

Another object of the present invention is to provide the use of the above glucose sensor electrode. The glucose sensor electrode is used for the efficient detection of glucose.

The objects of the present invention are achieved through the following technical solution:

A glucose sensor electrode is provided, including a titanium electrode whose surface is composed of a region formed by a nanoneedle titanium dioxide and a region formed by a nanocone-structured polypyrrole; the regions formed by the nanocone-structured polypyrrole each are adjacent to the regions formed by the nanoneedle titanium dioxide, which are located between the regions formed by the nanocone-structured polypyrrole; the regions formed by the nanocone-structured polypyrrole are grafted with an enzyme capable of detecting glucose. The enzyme capable of detecting glucose is glucose oxidase; at least one of the region formed by the nanoneedle titanium dioxide and the region formed by the nanocone-structured polypyrrole is a micro-region. The width (including all widths), diameter and/or area of the micro-region are in the order of micrometers.

The nanocone-structured polypyrrole is a doped or undoped nanocone-structured polypyrrole, preferably a doped nanocone-structured polypyrrole; the doped nanocone-structured polypyrrole is a citric-acid-doped nanocone-structured polypyrrole.

At least one of the region formed by the nanoneedle titanium dioxide and the region formed by the nanocone-structured polypyrrole is of multiple independent regions, each of which is a micro-region (i.e., the width, diameter and/or area of the region are in the order of micrometers (≤1000 μm), e.g., the width is in the order of micrometers if the region is rectangular, the diameter is in the order of micrometers if the region is circular, etc.).

A micro-region potential difference is generated between the region formed by the nanocone-structured polypyrrole and the region formed by the nanoneedle titanium dioxide.

The region formed by the nanocone-structured polypyrrole has an arbitrary shape, such as a circle, an ellipse, a rectangle, and a loop. When both the region formed by the nanoneedle titanium dioxide and the region formed by the nanocone-structured polypyrrole are of the multiple independent regions, the region formed by the nanoneedle titanium dioxide and the region formed by the nanocone-structured polypyrrole are arranged alternately or periodically. When the region formed by the nanoneedle titanium dioxide is of a whole region, and the region formed by the nanocone-structured polypyrrole is of the multiple independent regions, the regions formed by the nanocone-structured polypyrrole are arranged periodically, each surrounded by the region formed by the nanoneedle titanium dioxide.

The nanocone-structured polypyrrole is arranged on a chlorine-doped polypyrrole, i.e., the chlorine-doped polypyrrole is deposited between the nanocone-structured polypyrrole and the titanium electrode.

The preparation method for the glucose sensor electrode comprises the following steps:

(1) Alkali Heat Treatment of Titanium Surface removing an oxide film on the surface of the titanium electrode to obtain a pretreated titanium electrode; placing the pretreated titanium electrode in a hydrothermal reactor containing a NaOH solution for an alkali thermal reaction to form a nanoneedle-structured titanium dioxide film layer on the surface of the titanium electrode;

(2) Formation of Nanoneedle Titanium Dioxide Film Layer Having Micropattern forming grooves on the nanoneedle-structured titanium dioxide film layer to obtain a nanoneedle-structured titanium dioxide film layer having a micropattern, with the depth of the groove being the same as the thickness of the nanoneedle-structured titanium dioxide film layer; specifically, etching part of the nanoneedle-structured titanium dioxide film layer formed on the surface of the titanium electrode away by laser, thereby forming a nanoneedle-structured titanium dioxide film layer having the micropattern;

(3) Electrodeposition of Chlorine-Doped Polypyrrole a three-electrode mode is adopted, using a conductive metal as a counter electrode and the titanium electrode with the nanoneedle-structured titanium dioxide film layer having the micropattern in step (2) as a working electrode; an aqueous solution containing pyrrole and chloride ions is used as an electrolyte solution; with a chronopotentiometry method used to control the electrochemical reaction, the chlorine-doped polypyrrole is deposited in the groove pattern of the nanoneedle-structured titanium dioxide film layer having the micropattern;

(4) Construction of Nanocone-Structured Polypyrrole a three-electrode mode is adopted, using a conductive metal as a counter electrode and the titanium electrode deposited with the chlorine-doped polypyrrole in step (3) as a working electrode; a buffer solution containing pyrrole and citric acid is used as an electrolyte; with the chronopotentiometry method used to control the electrochemical reaction, a nanocone-structured citric-acid-doped polypyrrole is formed on the chlorine-doped polypyrrole, that is, the nanocone-structure citric-acid-doped polypyrrole is deposited in the groove pattern, thereby obtaining the titanium electrode with the nanoneedle-structured titanium dioxide and the nanocone-structured polypyrrole;

(5) Grafting Enzymes Capable of Detecting Glucose the enzyme capable of detecting glucose is grafted on the titanium electrode prepared in step (4) to obtain the glucose sensor electrode.

In step (1), the temperature of the alkali thermal reaction is 70° C. to 110° C., and the concentration of the sodium hydroxide solution is 1-4 mol/L, preferably 2 mol/L.

The alkali heat treatment time in step (1) is 12-36 hours, preferably 24 hours.

In step (1), "removing an oxide film on the surface of the titanium electrode" means pickling the titanium electrode, with a mixed solution of hydrofluoric acid and nitric acid used as the pickling solution.

The pickling time is 5-10 min, preferably 7 min.

The drying temperature in step (1) is ≤100° C.

In the laser etching in step (2), the laser power is 1-5 W, and the laser scanning speed is 50-300 mm/s. There are one or multiple grooves, preferably multiple grooves. When there are multiple grooves, the grooves are distributed in an array. In short, the grooves form multiple micro-regions.

In step (3), the current of the electrochemical reaction is 10-30 mA/cm$^2$, and the time of the electrochemical reaction is 10-40 s;

in step (3), the concentration of the chloride ion is 0.1-0.4 mol/L, and the concentration of pyrrole is 0.1-0.3 mol/L.

In step (4), the current of the electrochemical reaction is 0.5-2.0 mA/cm$^2$, and the time of the electrochemical reaction is 10-50 seconds, preferably 20 seconds; the conductive metal is platinum, copper, etc.; the buffer solution is a phosphate buffer solution.

The pH of the buffer solution in step (4) is 6.8-7.2.

In step (4), the concentration of pyrrole is 0.1-0.3 mol/L, and the concentration of citric acid is 0.05-0.3 mol/L.

The enzyme capable of detecting glucose in step (5) is glucose oxidase; the specific steps of step (5) are as follows: the titanium electrode prepared in step (4) is immersed in a PBS solution (a phosphate buffer solution) containing bovine serum protein and glucose oxidase for reaction to obtain the glucose sensor electrode.

In step (5), the concentrations of bovine serum protein (bovine serum protein modifies glucose oxidase to improve the enzyme in the thermostability and resistance to protease, etc.) and glucose oxidase are 30-80 g/L and 10-50 g/mL, respectively.

In step (5), the reaction temperature is 4° C. to 8° C., and the reaction time is 20-50 min, preferably 30 min.

The glucose sensor electrode is used for detection of glucose concentration.

The laser etching in step (2) refers to using an infrared fiber laser printer to etch the titanium dioxide film layer on the surface of the titanium electrode at room temperature. With the laser path, laser power and laser scanning speed set through software, the nanoneedle titanium dioxide film layer is patterned to prepare the micro-region array structure.

Compared with the prior art, the present invention has the following advantages and beneficial effects:

(1) The process of the present invention is simple, stable, and low in cost, and the coating (the nanoneedle titanium dioxide film layer and the nanocone-structured polypyrrole) is grown on the surface of the conductive substrate in situ with strong binding force and low Interface resistance;

(2) the electrode of the present invention is composed of the nanoneedle titanium dioxide and the nanocone-structured polypyrrole, with a micro-region formed by the nanocone-structured polypyrrole and a potential difference generated between the nanoneedle titanium dioxide and the nanocone-structured polypyrrole; the electric field of the micro-region promotes the adhesion of proteins, so that glucose oxidase can be efficiently grafted on the electrode surface;

(3) the electrode material of the present invention has high reliability for the detection of glucose.

DESCRIPTION OF THE INVENTION

Figure 1:
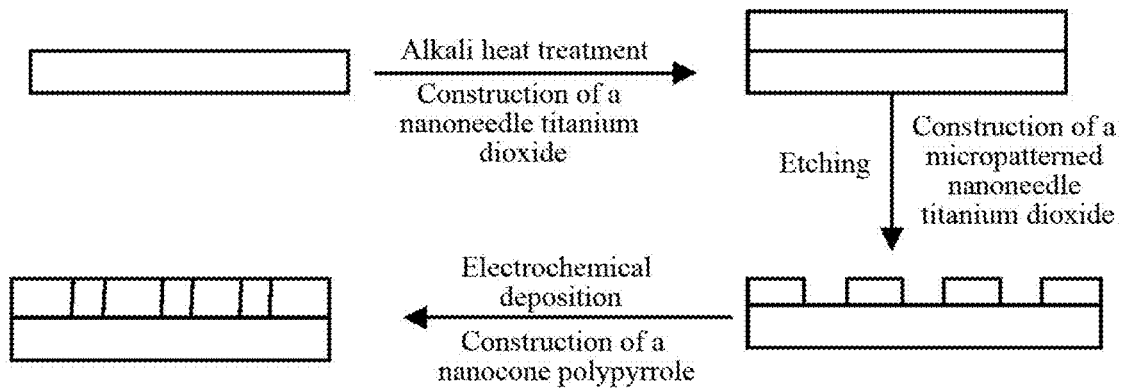
FIG. 1 is a schematic diagram of the preparation of the glucose sensor electrode (ungrafted with enzyme) in Example 1.

The present invention will be further described in detail below with reference to the examples and drawings, but the embodiments of the present invention are not limited thereto. Examples 1-4 relate to the preparation of the glucose sensor electrodes ungrafted with glucose oxidase, and Example 5 relates to the preparation of the glucose sensor electrodes grafted with glucose oxidase.

The glucose sensor electrodes in Examples 1-4 include a titanium electrode, whose surface is composed of a region formed by a nanoneedle titanium dioxide and a region formed by a nanocone-structured polypyrrole; the region formed by the nanoneedle titanium dioxide and the region formed by the nanocone-structured polypyrrole are of multiple rectangular independent regions, and arranged alternatively (i.e. arranged alternately on the surface of the titanium electrode).

Example 1

(1) Alkali Heat Treatment of Titanium Surface a titanium sheet (0.5 mm×10 mm×10 mm) was ultrasonically cleaned successively in acetone, ethanol and deionized water for 10 min; then a mixed acid (containing 0.54 mol/L of hydrofluoric acid and 0.25 mol/L of nitric acid) was used to clean the oxide layer on the surface of the titanium sheet for 7 min; the acid-treated material was ultrasonically cleaned in deionized water for 10 min, and then dried to obtain a pretreated titanium sheet; the pretreated titanium sheet was immersed in a hydrothermal reactor containing 70 mL of NaOH solution with a concentration of 2 mol/L, and reacted at a constant temperature of 100° C. for 24 hours; after the reaction, the titanium sheet was taken out, soaked and rinsed with deionized water, and then dried in a vacuum drying oven for use, here a nanoneedle-structured titanium dioxide layer being formed on the surface of the titanium sheet;

(2) at room temperature, an infrared fiber laser printer was used to etch the titanium sheet with the nanoneedle-structured titanium dioxide layer formed on the surface, with the software used to set a parallel light path, laser power at 2.8 W, and laser scanning speed at 100 mm/s; part of the nanoneedle-structured titanium dioxide layer was etched away by laser to form multiple grooves or channels, the depth of the grooves being the same as the thickness of the nanoneedle-structured titanium dioxide layer; the nanoneedle-structured titanium dioxide layer was divided into multiple parallel rectangular regions (60 μm in width) by the grooves, whose cross section was also rectangular (50 μm in width), with the grooves and the etched nanoneedle-structured titanium dioxide layer alternately arranged, thus obtaining a nanoneedle-structured titanium dioxide layer having the micropattern;

(3) Electrodepositing Chlorine-Doped Polypyrrole in Groove by Electrochemical Method a three-electrode mode was adopted, using a titanium sheet with the nanoneedle-structured titanium dioxide layer having the micropattern on the surface as the working electrode, a copper sheet as the counter electrode and a saturated calomel electrode as the reference electrode; in the electrolyte solution, the concentrations of pyrrole and hydrochloric acid were 0.2 mol/L and 0.25 mol/L, respectively; the chronopotentiometry method was used to control the electrochemical reaction, with the reaction current being 20 mA/cm$^2$ and the reaction time being 20 seconds, thereby depositing a layer of chlorine-doped polypyrrole in the groove pattern (the part etched by the laser); after the reaction, the titanium sheet was immersed in deionized water to remove unreacted pyrrole and hydrochloric acid on the surface, thereby obtaining a titanium electrode deposited with the chlorine-doped polypyrrole;

(4) Construction of Nanocone-Structured Polypyrrole a three-electrode mode was adopted, using the titanium electrode deposited with the chlorine-doped polypyrrole as the working electrode, a copper sheet as the counter electrode and a saturated calomel electrode as the reference electrode; the electrolyte solution was a buffer solution of pyrrole and citric acid (pH of the solution was 6.8, PBS), in which the concentrations of pyrrole and citric acid were 0.2 mol/L and 0.1 mol/L, respectively; the chronopotentiometry method was used to control the electrochemical reaction, with the reaction current being 1.5 mA/cm$^2$ and the reaction time being 20 seconds; a nanocone-structured polypyrrole/citric acid composite (the citric-acid-doped nanocone-structured polypyrrole was deposited in the groove etched by laser) was deposited on the chlorine-doped polypyrrole to obtain a working electrode (a glucose sensor electrode ungrafted with glucose oxidase), where the nanocone-structured polypyrrole/citric acid and the nanoneedle-structured titanium dioxide micro-regions were arranged alternately.

Figure 2:
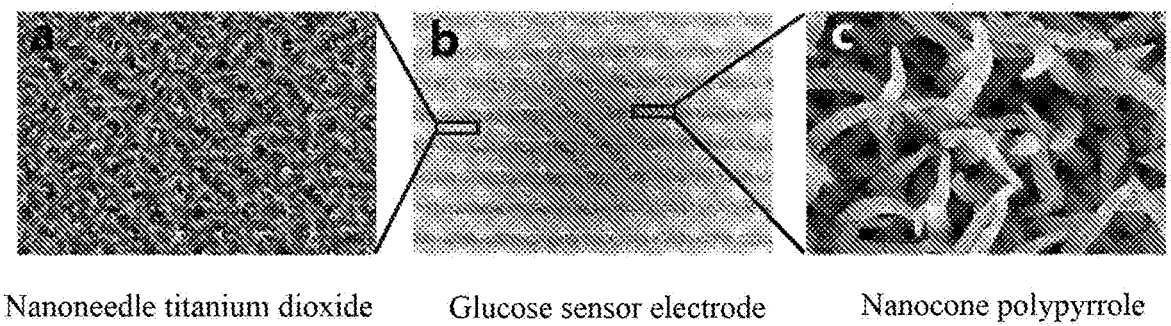
FIG. 2 shows a scanning electronic image of the glucose sensor electrode (ungrafted with enzyme) prepared in Example 1; a: nanoneedle titanium dioxide, b: glucose sensor electrode, c: nanocone polypyrrole (doped with citric acid)
Figure 3:
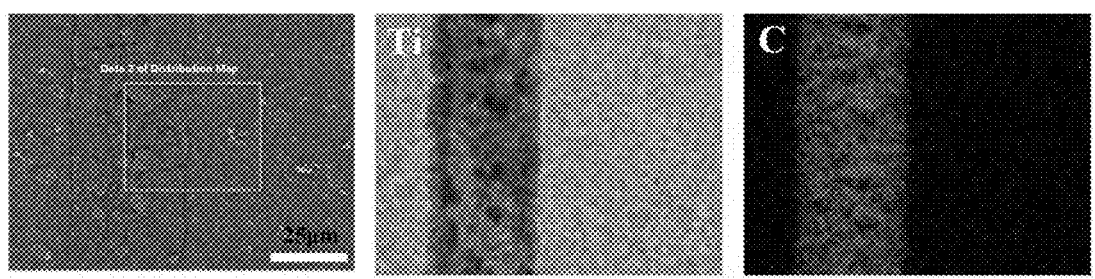
FIG. 3 is an element distribution diagram of the glucose sensor electrode (ungrafted with enzyme) prepared in Example 1; left: scanning electron micrograph, middle: surface distribution map of element Ti, right: surface distribution map of element C.

FIG. 1 is a schematic diagram of the preparation of the glucose sensor electrode ungrafted with glucose oxidase in this example. FIG. 2 is an SEM image of the glucose sensor electrode ungrafted with glucose oxidase prepared in Example 1. As shown in FIG. 2, the nanocone-structured polypyrrole/citric acid and the nanoneedle-structured titanium dioxide micro-regions were arranged alternately in the electrode. The titanium dioxide nanoneedles formed by the alkali heat treatment grew perpendicular to the titanium surface; after laser etching, the non-conductive titanium dioxide film layer was partially etched away, revealing the conductive titanium substrate, which provided a basis for further polymerization of polypyrrole. Through template-free electrochemical polymerization, the polypyrrole nanocones (doped with citric acid) grew perpendicular to the surface of the conductive titanium substrate. FIG. 3 shows the element distribution of the glucose sensor electrode ungrafted with glucose oxidase prepared in Example 1; left:

scanning electron micrograph, middle: surface distribution map of element Ti, right: surface distribution map of element C, where the semiconductor titanium dioxide structure and the conductive polypyrrole structure were arranged alternately. As shown in FIG. 3, the distribution of elements C and Ti on the electrode surface (ungrafted with glucose oxidase) indicates that the conductive polypyrrole and titanium dioxide were distributed alternately, the width of the titanium dioxide portion being 60 μm, the width of the polypyrrole portion being 50 μm.

In the electrode prepared in this example, the film layer on the surface of the material was deposited by in-situ growth with a stronger bonding force.

Example 2

(1) Alkali Heat Treatment of Titanium Surface a titanium sheet (0.5 mm×10 mm×10 mm) was ultrasonically cleaned successively in acetone, ethanol and deionized water for 10 min; then a mixed acid (containing 0.54 mol/L of hydrofluoric acid and 0.25 mol/L of nitric acid) was used to clean the oxide layer on the surface of the titanium sheet for 7 min; the acid-treated material was ultrasonically cleaned in deionized water for 10 min, and then dried to obtain a pretreated titanium sheet; the pretreated titanium sheet was immersed in a hydrothermal reactor containing 70 mL of NaOH solution with a concentration of 2 mol/L, and reacted at a constant temperature of 100° C. for 24 hours; after the reaction, the titanium sheet was taken out, soaked and rinsed with deionized water, and then dried in a vacuum drying oven for use, here a nanoneedle-structured titanium dioxide layer being formed on the surface of the titanium sheet;

(2) at room temperature, an infrared fiber laser printer was used to etch the titanium sheet with the nanoneedle-structured titanium dioxide layer formed on the surface, with the software used to set a parallel light path (the interval between the light paths was 100 μm, and the width of the light spot was 30 μm kept by the instrument), laser power at 2.8 W, and laser scanning speed at 300 mm/s; part of the nanoneedle-structured titanium dioxide layer was etched away by laser to form multiple grooves or channels, the depth of the grooves being the same as the thickness of the nanoneedle-structured titanium dioxide layer; the nanoneedle-structured titanium dioxide layer was divided into multiple parallel rectangular regions by the grooves, whose cross section was also rectangular, with the grooves and the etched nanoneedle-structured titanium dioxide layer alternately arranged, thus obtaining a nanoneedle-structured titanium dioxide layer having the micropattern;

(3) Electrodepositing Chlorine-Doped Polypyrrole in Groove by Electrochemical Method a three-electrode mode was adopted, using a titanium sheet with the nanoneedle-structured titanium dioxide layer having the micropattern on the surface as the working electrode, a copper sheet as the counter electrode and a saturated calomel electrode as the reference electrode; in the electrolyte solution, the concentrations of pyrrole and hydrochloric acid were 0.2 mol/L and 0.25 mol/L, respectively; the chronopotentiometry method was used to control the electrochemical reaction, with the reaction current being 20 mA/cm$^2$ and the reaction time being 20 seconds, thereby depositing a layer of chlorine-doped polypyrrole in the groove pattern (the part etched by the laser); after the reaction, the titanium sheet was immersed in deionized water to remove unreacted pyrrole and hydrochloric acid on the surface, thereby obtaining a titanium electrode deposited with the chlorine-doped polypyrrole;

(4) Construction of Nanocone-Structured Polypyrrole a three-electrode mode was adopted, using the titanium electrode deposited with the chlorine-doped polypyrrole as the working electrode, a copper sheet as the counter electrode and a saturated calomel electrode as the reference electrode; the electrolyte solution was a buffer solution of pyrrole and citric acid (pH of the solution was 6.8, PBS), in which the concentrations of pyrrole and citric acid were 0.2 mol/L and 0.1 mol/L, respectively; the chronopotentiometry method was used to control the electrochemical reaction, with the reaction current being 1.5 mA/cm$^2$ and the reaction time being 20 seconds; a nanocone-structured polypyrrole/citric acid composite (the citric-acid-doped nanocone-structured polypyrrole was deposited in the groove etched by laser) was deposited on the chlorine-doped polypyrrole to obtain a working electrode (a glucose sensor electrode ungrafted with glucose oxidase), where the nanocone-structured polypyrrole/citric acid and the nanoneedle-structured titanium dioxide micro-regions were arranged alternately.

The structure and detection performance of the composite material prepared in this example were similar to those in Example 1.

Example 3

(1) Alkali Heat Treatment of Titanium Surface a titanium sheet (0.5 mm×10 mm×10 mm) was ultrasonically cleaned successively in acetone, ethanol and deionized water for 10 min; then a mixed acid (containing 0.54 mol/L of hydrofluoric acid and 0.25 mol/L of nitric acid) was used to clean the oxide layer on the surface of the titanium sheet for 7 min; the acid-treated material was ultrasonically cleaned in deionized water for 10 min, and then dried to obtain a pretreated titanium sheet; the pretreated titanium sheet was immersed in a hydrothermal reactor containing 70 mL of NaOH solution with a concentration of 2 mol/L, and reacted at a constant temperature of 100° C. for 24 hours; after the reaction, the titanium sheet was taken out, soaked and rinsed with deionized water, and then dried in a vacuum drying oven for use, here a nanoneedle-structured titanium dioxide layer being formed on the surface of the titanium sheet;

(2) at room temperature, an infrared fiber laser printer was used to etch the titanium sheet with the nanoneedle-structured titanium dioxide layer formed on the surface, with the software used to set a parallel light path (the interval between the light paths was 100 μm, and the width of the light spot was 30 μm kept by the instrument), laser power at 5 W, and laser scanning speed at 100 mm/s; part of the nanoneedle-structured titanium dioxide layer was etched away by laser to form multiple grooves or channels, the depth of the grooves being the same as the thickness of the nanoneedle-structured titanium dioxide layer; the nanoneedle-structured titanium dioxide layer was divided into multiple parallel rectangular regions by the grooves, whose cross section was also rectangular, with the grooves and the etched nanoneedle-structured titanium dioxide layer alternately arranged, thus obtaining a nanoneedle-structured titanium dioxide layer having the micropattern;

(3) Electrodepositing Chlorine-Doped Polypyrrole in Groove by Electrochemical Method a three-electrode mode was adopted, using a titanium sheet with the nanoneedle-structured titanium dioxide layer having the micropattern on the surface as the working electrode, a copper sheet as the counter electrode and a saturated calomel electrode as the reference electrode; in the electrolyte solution, the concentrations of pyrrole and hydrochloric acid were 0.2 mol/L and 0.25 mol/L, respectively; the chronopotentiometry method was used to control the electrochemical reaction, with the reaction current being 30 $mA/cm^2$ and the reaction time being 20 seconds, thereby depositing a layer of chlorine-doped polypyrrole in the groove pattern (the part etched by the laser); after the reaction, the titanium sheet was immersed in deionized water to remove unreacted pyrrole and hydrochloric acid on the surface, thereby obtaining a titanium electrode deposited with the chlorine-doped polypyrrole;

(4) Construction of Nanocone-Structured Polypyrrole a three-electrode mode was adopted, using the titanium electrode deposited with the chlorine-doped polypyrrole as the working electrode, a copper sheet as the counter electrode and a saturated calomel electrode as the reference electrode; the electrolyte solution was a buffer solution of pyrrole and citric acid (pH of the solution was 6.8, PBS), in which the concentrations of pyrrole and citric acid were 0.2 mol/L and 0.1 mol/L, respectively; the chronopotentiometry method was used to control the electrochemical reaction, with the reaction current being 1.5 $mA/cm^2$ and the reaction time being 20 seconds; a nanocone-structured polypyrrole/citric acid composite (the citric-acid-doped nanocone-structured polypyrrole was deposited in the groove etched by laser) was deposited on the chlorine-doped polypyrrole to obtain a working electrode (a glucose sensor electrode ungrafted with glucose oxidase), where the nanocone-structured polypyrrole/citric acid and the nanoneedle-structured titanium dioxide micro-regions were arranged alternately.

The structure and detection performance of the composite material prepared in this example were similar to those in Example 1.

Example 4

(1) Alkali Heat Treatment of Titanium Surface a titanium sheet (0.5 mm×10 mm×10 mm) was ultrasonically cleaned successively in acetone, ethanol and deionized water for 10 min; then a mixed acid (containing 0.54 mol/L of hydrofluoric acid and 0.25 mol/L of nitric acid) was used to clean the oxide layer on the surface of the titanium sheet for 7 min; the acid-treated material was ultrasonically cleaned in deionized water for 10 min, and then dried to obtain a pretreated titanium sheet; the pretreated titanium sheet was immersed in a hydrothermal reactor containing 70 mL of NaOH solution with a concentration of 2 mol/L, and reacted at a constant temperature of 100° C. for 24 hours; after the reaction, the sample was taken out, soaked and rinsed with deionized water, and then dried in a vacuum drying oven for use, here a nanoneedle-structured titanium dioxide layer being formed on the surface of the titanium sheet;

(2) at room temperature, an infrared fiber laser printer was used to etch the titanium sheet with the nanoneedle-structured titanium dioxide layer formed on the surface; with the software used to set a parallel light path (the interval between the light paths was 100 μm, and the width of the light spot was 30 μm kept by the instrument), laser power at 2.8 W, and laser scanning speed at 100 mm/s; part of the nanoneedle-structured titanium dioxide layer was etched away by laser to form multiple grooves or channels, the depth of the grooves being the same as the thickness of the nanoneedle-structured titanium dioxide layer; the nanoneedle-structured titanium dioxide layer was divided into multiple parallel rectangular regions by the grooves, whose cross section was also rectangular, with the grooves and the etched nanoneedle-structured titanium dioxide layer alternately arranged, thus obtaining a nanoneedle-structured titanium dioxide layer having the micropattern;

(3) Electrodepositing Chlorine-Doped Polypyrrole in Groove by Electrochemical Method a three-electrode mode was adopted, using a titanium sheet with the nanoneedle-structured titanium dioxide layer having the micropattern on the surface as the working electrode, a copper sheet as the counter electrode and a saturated calomel electrode as the reference electrode; in the electrolyte solution, the concentrations of pyrrole and hydrochloric acid were 0.2 mol/L and 0.25 mol/L, respectively; the chronopotentiometry method was used to control the electrochemical reaction, with the reaction current being 20 $mA/cm^2$ and the reaction time being 20 seconds, thereby depositing a layer of chlorine-doped polypyrrole in the groove pattern (the part etched by the laser); after the reaction, the titanium sheet was immersed in deionized water to remove unreacted pyrrole and hydrochloric acid on the surface, thereby obtaining a titanium electrode deposited with the chlorine-doped polypyrrole;

(4) Construction of Nanocone-Structured Polypyrrole a three-electrode mode was adopted, using the titanium electrode deposited with the chlorine-doped polypyrrole as the working electrode, a copper sheet as the counter electrode and a saturated calomel electrode as the reference electrode; the electrolyte solution was a buffer solution of pyrrole and citric acid (pH of the solution was 6.8, PBS), in which the concentrations of pyrrole and citric acid were 0.2 mol/L, respectively; the chronopotentiometry method was used to control the electrochemical reaction, with the reaction current being 0.9 $mA/cm^2$ and the reaction time being 20 seconds; a nanocone-structured polypyrrole/citric acid composite (the citric-acid-doped nanocone-structured polypyrrole was deposited in the groove etched by laser) was deposited on the chlorine-doped polypyrrole to obtain a working electrode (a glucose sensor electrode ungrafted with glucose oxidase), where the nanocone-structured polypyrrole/citric acid and the nanoneedle-structured titanium dioxide micro-regions were arranged alternately.

The structure and detection performance of the composite material prepared in this example were similar to those in Example 1.

Example 5

The glucose sensor electrode (ungrafted with glucose oxidase) prepared in Example 1 was immersed in PBS containing bovine serum protein (50 mg/mL) and glucose oxidase (25 mg/mL), reacted at 4° C. for 30 min, then soaked and rinsed with PBS, and then stored in a refrigerator at 4° C. until use.

An electrochemical workstation was used for glucose detection. A three-electrode mode was adopted, using the micropatterned glucose sensor electrode (grafted with glucose oxidase) as the working electrode, a copper sheet as the counter electrode and a saturated calomel electrode as the reference electrode; PBS solutions containing different concentrations of glucose were used as electrolyte solutions to simulate real blood glucose detection. With the test carried out at 37° C., a voltage of 0.3 V was applied to the working electrode, and a current value was recorded after the current curve was stable. The concentration range of glucose was 0.1-4.0 mmol/L.

Figure 4:
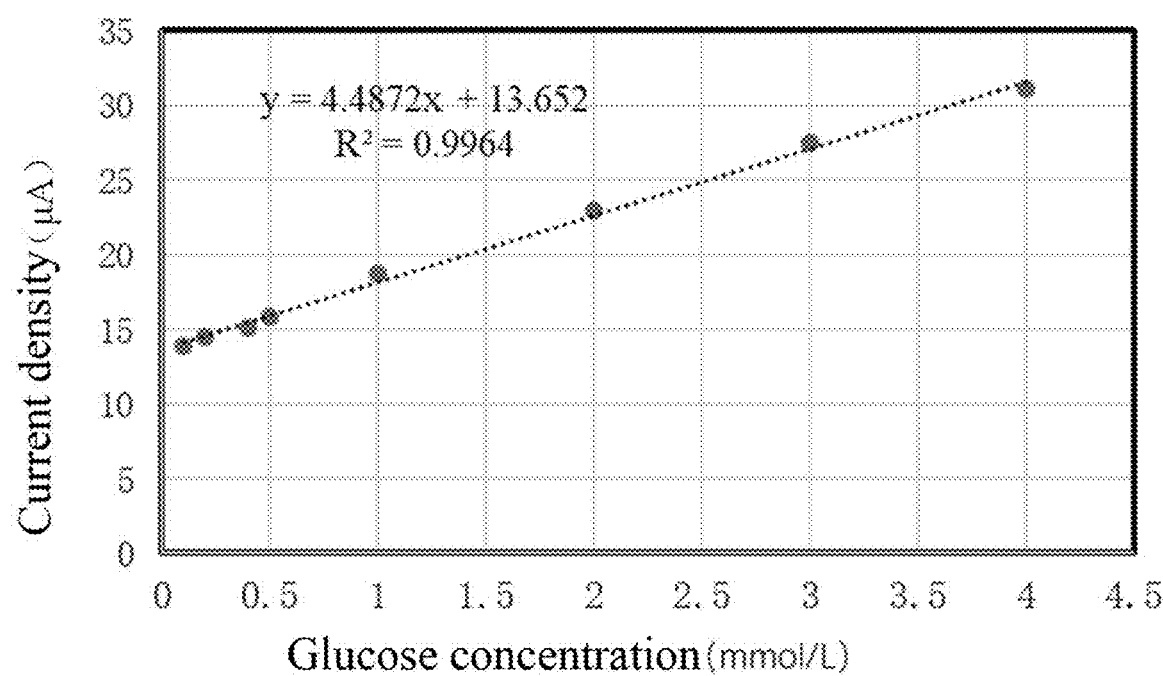
FIG. 4 shows the relationship between the current response detected by the glucose sensor electrode and the glucose concentration in Example 5.

FIG. 4 shows the relationship between the current response detected by the glucose sensor electrode and the glucose concentration in Example 5, indicating the trend of the current value changing with the glucose concentration. The curve was linearly fitted to obtain a linear equation of current value (y) and glucose concentration (x), i.e., y=4.4872x+13.652, with a linear correlation coefficient $R^2$=0.9964. Therefore, the prepared glucose sensor electrode had high reliability for the glucose detection.

The electrodes prepared in Examples 2-4, after being grafted with glucose oxidase, also had high reliability for the detection of glucose.

The invention claimed is:

1. A glucose sensor electrode comprising a titanium electrode, whose surface is composed of a region formed by a nanoneedle titanium dioxide and a region formed by a nanocone-structured polypyrrole; the regions formed by the nanocone-structured polypyrrole each are adjacent to the regions formed by the nanoneedle titanium dioxide, which are located between the regions formed by the nanocone-structured polypyrrole; the regions formed by the nanocone-structured polypyrrole are grafted with an enzyme capable of detecting glucose; at least one of the region formed by the nanoneedle titanium dioxide and the region formed by the nanocone-structured polypyrrole is a micro-region.

2. The glucose sensor electrode according to claim 1, wherein at least one of the region formed by the nanoneedle titanium dioxide and the region formed by the nanocone-structured polypyrrole is of multiple independent regions, each of which is a micro-region;
the enzyme capable of detecting glucose is glucose oxidase; the nanocone-structured polypyrrole is a doped or undoped nanocone-structured polypyrrole; a potential difference is generated between the region formed by the nanocone-structured polypyrrole and the region formed by the nanoneedle titanium dioxide.

3. The glucose sensor electrode according to claim 2, wherein the nanocone-structured polypyrrole is the doped nanocone-structured polypyrrole, which is a citric-acid-doped nanocone-structured polypyrrole.

4. The glucose sensor electrode according to claim 2, wherein when both the region formed by the nanoneedle titanium dioxide and the region formed by the nanocone-structured polypyrrole are of the multiple independent regions, the region formed by the nanoneedle titanium dioxide and the region formed by the nanocone-structured polypyrrole are arranged alternately or periodically;
when the region formed by the nanoneedle titanium dioxide is of a whole region, and the region formed by the nanocone-structured polypyrrole is of the multiple independent regions, the regions formed by the nanocone-structured polypyrrole are arranged periodically, each surrounded by the region formed by the nanoneedle titanium dioxide.

5. The glucose sensor electrode according to claim 1, wherein the nanocone-structured polypyrrole is arranged on a chlorine-doped polypyrrole, i.e., the chlorine-doped polypyrrole is deposited between the nanocone-structured polypyrrole and the titanium electrode.

6. A preparation method for the glucose sensor electrode according to claim 1, comprising:

(1)
removing an oxide film on the surface of the titanium electrode to obtain a pretreated titanium electrode; placing the pretreated titanium electrode in a hydrothermal reactor containing a NaOH solution for an alkali thermal reaction to form a nanoneedle-structured titanium dioxide film layer on the surface of the titanium electrode;

(2)
forming grooves on the nanoneedle-structured titanium dioxide film layer to obtain a nanoneedle-structured titanium dioxide film layer having a micropattern;

(3)
depositing the chlorine-doped polypyrrole in the groove pattern of the nanoneedle-structure titanium dioxide film layer having the micropattern by a three-electrode mode using a conductive metal as a counter electrode and the titanium electrode with the nanoneedle-structured titanium dioxide film layer having the micropattern in step (2) as a working electrode; and an aqueous solution containing pyrrole and chloride ions is used as an electrolyte solution; with a chronopotentiometry method used to control the electrochemical reaction;

(4)
forming a nanocone-structure citric-acid-doped polypyrrole on the chlorine-doped polypyrrole in the groove pattern by a three-electrode mode using a conductive metal as a counter electrode and the titanium electrode deposited with the chlorine-doped polypyrrole in step (3) as a working electrode; and a buffer solution containing pyrrole and citric acid is used as an electrolyte; with the chronopotentiometry method used to control the electrochemical reaction, thereby obtaining the titanium electrode with the nanoneedle-structured titanium dioxide and the nanocone-structured polypyrrole;

(5)
grafting the enzyme capable of detecting glucose on the titanium electrode prepared in step (4) to obtain the glucose sensor electrode.

7. The preparation method for the glucose sensor electrode according to claim 6, wherein in step (1), the temperature of the alkali thermal reaction is 70° C. to 110° C., and the concentration of the sodium hydroxide solution is 1-4 mol/L;
the alkali heat treatment time in step (1) is 12-36 hours;
in step (3), the current of the electrochemical reaction is 10-30 mA/cm$^2$, and the time of the electrochemical reaction is 10-40 seconds;
in step (4), the current of the electrochemical reaction is 0.5-2.0 mA/cm$^2$, and the time of the electrochemical reaction is 10-50 seconds.

8. The preparation method for the glucose sensor electrode according to claim 6, wherein in step (3), the concentration of the chloride ion is 0.1-0.4 mol/L, and the concentration of pyrrole is 0.1-0.3 mol/L;
the pH of the buffer solution in step (4) is 6.8-7.2;

in step (4), the concentration of pyrrole is 0.1-0.3 mol/L, and the concentration of citric acid is 0.05-0.3 mol/L;

the enzyme capable of detecting glucose in step (5) is glucose oxidase; ti the specific steps of step (5) are as follows: the titanium electrode prepared in step (4) is immersed in a PBS solution containing bovine serum protein and glucose oxidase for reaction to obtain the glucose sensor electrode.

9. The preparation method for the glucose sensor electrode according to claim 8, wherein the concentrations of bovine serum protein and glucose oxidase in step (5) are 30-80 g/L and 10-50 g/mL, respectively;

in step (5), the reaction temperature is 4° C. to 8° C., and the reaction time is 20-50 min.

10. The glucose sensor electrode according to claim 1, wherein the glucose sensor electrode is used for detection of glucose concentration.

* * * * *

UNITED STATES PATENT AND TRADEMARK OFFICE
CERTIFICATE OF CORRECTION

| | |
|---|---|
| PATENT NO. | : 11,788,984 B2 |
| APPLICATION NO. | : 17/054790 |
| DATED | : October 17, 2023 |
| INVENTOR(S) | : Chengyun Ning et al. |

It is certified that error appears in the above-identified patent and that said Letters Patent is hereby corrected as shown below:

In the Claims

Column 12, Line 26, Claim 6, delete "structure" and insert -- structured --

Column 13, Line 4, Claim 8, before "the" delete "ti"

Signed and Sealed this
Twelfth Day of December, 2023

Katherine Kelly Vidal
*Director of the United States Patent and Trademark Office*